July 25, 1939.  C. E. PAGE  2,167,085
METHOD OF TREATING COFFEE
Filed April 5, 1937
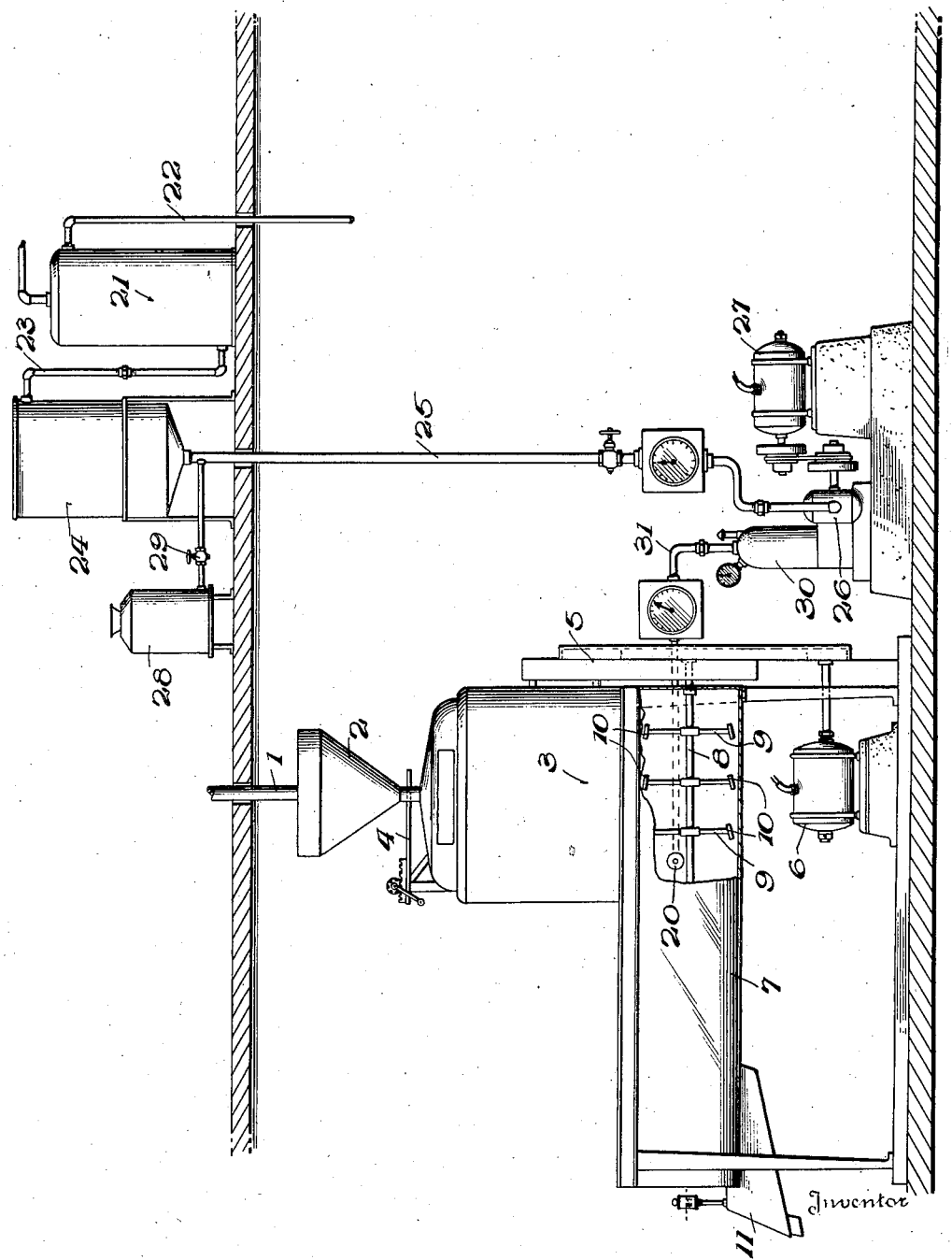
Inventor
Charles E. Page
By Samuel Scrivener Jr.
Attorney Patented July 25, 1939

2,167,085

UNITED STATES PATENT OFFICE 2,167,085

METHOD OF TREATING COFFEE

Charles E. Page, Los Angeles, Calif.

Application April 5, 1937, Serial No. 135,110

2 Claims. (Cl. 99—152)

This invention relates to the manufacture or preparation of coffee and, more particularly, relates to a new method or process for treating coffee during the manufacture thereof, by virtue of which process health-giving materials may be added to the coffee and the quality and strength of the coffee may be improved.

It is well-known in the art of coffee manufacture and handling that the quality and strength of coffee deteriorate from the time of grinding. This deterioration is appreciable for approximately the first ten days after grinding and after that period the deterioration is accelerated and the coffee eventually becomes stale and rancid. In studying this problem, I have found that this effect is due largely to the loss by the ground coffee of the moisture originally contained therein and the volatilization of the essential oils contained in the coffee. In this connection it must be noted that the un-ground coffee bean consists of an internal cellular structure which is ligneous in character, this being covered by an outer wall or casing of a more impervious nature. Before grinding, this relatively impervious shell substantially prevents the loss of moisture from the interior cellular structure of the bean and also assists in maintaining the essential oils in their natural state. Upon grinding, however, the internal cellular structure is cut into very small particles which have no outer covering. The ordinary processes of evaporation cause the loss of nearly all of the moisture within the cellular particles of the ground coffee, the essential oils also being permitted to volatilize. These processes occur within the time limits generally indicated hereinbefore, causing staleness and rancidity of the coffee.

It is known that, during the roasting of coffee, valuable constituents thereof are driven off and dissipated. Among these are carbon dioxide, volatile oils, esters, sugars, moisture and other desirable constituents. It is now a matter of limited practice to re-introduce carbon dioxide into the ground coffee by injecting it in gaseous form into a container having ground coffee therein, or by placing within the container a small amount of solid carbon dioxide. The chief disadvantage inherent in both of these methods of re-impregnating the coffee with carbon dioxide is that the gas is not effectively absorbed into the ground coffee, it being apparent that there may be a mechanical mixture of the gas and coffee, and that the gas will be at least partly released from the coffee upon the release of any pressure on the gas-coffee mixture.

It has also been suggested that the addition of health-giving substances such as vitamins and enzymes to coffee would be advantageous and beneficial. This suggestion has never resulted in practical application, however, due to the fact that no practical and efficient means has yet been proposed for introducing these materials into the coffee.

It is a principal object of this invention to provide a process of treating coffee during the manufacture thereof, by virtue of which the ground coffee will be caused to retain the natural moisture, essential oils, esters and other desirable constituents occluded therein, whereby the quality and strength of the coffee are improved and deterioration of the coffee, as by staleness and rancidity, is greatly retarded.

It is a further object of the invention to provide a process for treating coffee whereby substances removed from the coffee during the roasting operation may be replaced in an efficient manner by forming an aqueous solution of such substances or suspending them in water or other liquid and then impregnating the coffee with such solution or suspension.

It is a further object of the invention to provide a process for treating coffee whereby health giving substances may be introduced into the coffee in such a manner as to be retained and held therein.

Other objects and features of novelty of the invention will be apparent from the following specification and the annexed drawing, it being clearly understood, however, that the invention is not limited in any way by such description and drawing, or otherwise than by the appended claims.

The single figure of the drawing denotes in a schematic manner one means by which the process according to this invention may be carried out.

As pointed out hereinbefore, my studies of the structure, chemistry and nature of coffee have indicated to me the cellular nature of the interior of the coffee bean and the fact that natural moisture and essential oils of the bean are disposed within the cell structure and the cells of the bean. It is this moisture and other constituents which, when subjected to pyrolysis or oxidation are driven off during the roasting of the coffee, causing a shrinkage in the weight of the coffee which may be as great as twenty-two percent of the original weight of the green beans. When excess water is used in quenching the roast a small part of this shrinkage is replaced but it will be apparent that the roasted bean is considerably deficient in moisture. The moisture and essential oils which remain in the bean are, as indicated above, disposed within the cellular internal structure of the bean and are protected to some extent by the relatively impervious coating of the unground bean. When the coffee is ground, this cellular structure is cut and the moisture and oils are exposed to the atmosphere and to oxidizing influences, whereby the ordinary and usual processes of drying, evaporation and oxidation will act upon them, causing eventual staleness and rancidity of the coffee.

I have found that if the exposed cellular structure of the interior of the coffee bean, after grinding, is slightly moistened the ligneous walls composing the cell structure tend to swell and in so doing close or partially close the cells in such a manner and to such a degree that the natural moisture and essential oils within the cells are held therein. This effect is not sufficient, of course, to prevent the proper extraction of the moisture and oils when the coffee is brewed but, on the contrary, expedites the brewing. The effect is sufficient, however, to materially retard the normal processes of drying, evaporation and oxidation whereby the life of the coffee, before staleness and rancidity occur, is increased in such a degree that for practical purposes and in usual circumstances the occurrence of these conditions will be materially delayed. It has been found that water will not cause oleaginous substances to become rancid or oxidize and it is therefore permissible to use water or an aqueous solution as a humidifying means in carrying out this process. The process is effective in preventing or retarding oxidation of the coffee in another respect, this being due to the fact that coffee which has been processed according to the present invention forms a somewhat more compact mass when disposed within a container, whereby the circulation of air through the container is materially reduced.

I have also found that when coffee is treated in the manner according to this invention the moisture which is introduced to the ground coffee reacts with the essential oils thereof with the direct effect of retarding the evolution of the oils and preserving them from becoming rancid.

The impregnation of the coffee with substances removed therefrom during the roasting operation, and with health-giving substances such as vitamins and enzymes is made possible and rendered easy of fulfillment by means of this process. Any of these substances may be put into an aqueous solution which is introduced to the ground coffee. It will be apparent that the water, spray or water vapor containing the substances to be added will be absorbed by the ground coffee, thus insuring that the material will be absorbed over all surfaces of the particles and will then be absorbed throughout the cellular structure. Due to the swelling of the ligneous material of the ground beans, moisture containing the added substances and occluded within the ground particle of coffee will be retained therein and will not escape as in prior attempts to introduce these substances into coffee.

In carrying my invention into practical application, I have found that the moisture, either alone or with added substances in solution, may be most efficiently added to the coffee as a spray or vapor which is mixed with the ground coffee. While any other means of adding the moisture, either with or without added substances, may be employed within the scope of the invention, I have found that if the water or solution is thoroughly atomized, as by forcing it through a spray device, or by causing it to form a mist or vapor in some other known manner, and is then mixed with coffee immediately after the grinding operation, optimum results are secured.

It is preferable to heat the water or solution before introducing it to the coffee, a heat of approximately 75° C. having been found to give good results. While cold water or solution will cause the desired closing of the cells of the bean, it has been found that hot water or a hot solution is more efficient in causing partial saponification of the essential oils, and for this reason the use of a vapor or mist of hot water or solution is most advantageous.

In the single figure of the drawing there is disclosed a schematic arrangement whereby the process according to this invention may be put into effect. In this arrangement, which is for purposes of illustration only, the roasted coffee may be delivered through conveyer 1 from cooling pans or other storage means, not shown, to a hopper 2, the lower outlet of which delivers the roasted, un-ground coffee to a grinding mill 3, a gate 4 being provided for controlling the rate of delivery. The grinding mill, which may be of any suitable type, is driven, through gearing 5, by a motor or other prime mover 6. In the preferred type of apparatus, the ground coffee is delivered at the bottom of the grinding mill into one end of an elongated, cylindrical receptacle 7 within and axially of which there is provided a rotatable shaft 8 having a plurality of radial arms 9 mounted thereon. The ends of these arms are provided with paddles 10 which are so arranged that, as the shaft and arms rotate, the paddles will move the ground coffee slowly from the inlet end of the container 7 to the outlet or delivery end 11 thereof where the coffee may be delivered to packaging or other apparatus. The shaft 8 may be driven, through reduction gearing, by the motor 6.

In order to introduce the water or solution to the ground coffee, a spray or mist-forming device 20 is mounted within the container 7 adjacent the outlet from the grinding mill and is so arranged as to direct the spray or mist in the direction of movement of the coffee as it is moved by the paddles 10. It will be apparent that the spray or mist delivered by the device 20 will come into immediate contact with the ground coffee and will be thoroughly mixed and churned therewith, to thereby cause full and complete impregnation of the coffee by the water or solution. While it is preferred that the device 20 be disposed at the inlet end of the container 7, it may, if desired, be disposed at the outlet end thereof, in which event it will direct the spray or mist in a direction in opposition to the movement of the coffee by the paddles 10.

Means are provided for delivering water or solution to the spray or misting device 20, and such means comprise a water heater 21 which is preferably disposed considerably above the level of the spray device 20, and to which water, which has been distilled or otherwise purified, is delivered by pipe 22. Hot water from heater 21 is delivered by pipe 23 to reservoir 24 which is preferably arranged at the same level as the heater 21. The outlet from reservoir 24 comprises a pipe 25 which leads downwardly to a pump 26 which is arranged adjacent the spray device 20 and which may be driven by a motor 27. If a solution of carbon dioxide or any other material is to be introduced to the coffee instead of pure water, such added substance may be contained in a tank 28 which is aranged adjacent the reservoir 24 and which delivers to the reservoir 24 or the pipe 25 the material to be added, in proper quantities as may be determined by a valve 29 which is disposed in the pipe connecting tank 28 to reservoir 24 or pipe 25. The outlet from pump 26 is connected to the spray or misting device 20 through pressure tank 30 and pipe 31. It will be apparent that suitable pressure gauges and relief valves may be arranged in the system in order to give proper indications of pressure and proportioning of water or solution to the amount of coffee being delivered by the grinding mill, and to insure the safety of the system.

The operation of the apparatus described will be apparent. Either pure water from reservoir 24 or a solution of some substance in such pure water will be supplied through pipe 25 to pump 26, the disposition of the tanks 24 and 28 above the pump providing a hydrostatic head at the inlet side of the pump. Water or solution under pressure will be supplied by the pump to the device 20 where it will be transformed into a spray or mist or vapor and mixed with the ground coffee in the manner hereinbefore described.

It has been found that the treatment of coffee in accordance with this invention is productive not only of the beneficial results referred to, but has another and very valuable effect. It has heretofore been observed that the coffee in a container will tend to become stratified, i. e. the smaller particles of coffee will go to the bottom of the container, while the larger particles will remain in the upper part thereof. However, if coffee is treated in the manner according to this invention, the particles within a container form a more coherent mass and will not become stratified. This is decidedly advantageous in that coffee treated in accordance with this invention is homogeneous in size in all parts of the container, thereby insuring that a similar brew may be made from all parts of the container.

While I have described one means for carrying out my process, it will be apparent to those skilled in the art that other means may be employed without departing from the spirit or scope of the invention. For example, if desired, the water or solution need not be introduced to the ground coffee as a mist or spray but may be added to the coffee as an un-atomized fluid. In either case, the humidification of the coffee would be sufficient, although it has been determined that humidification by spraying or misting is more satisfactory and efficient. I have also found that the coffee may be humidified with considerably less efficiency, prior to grinding but after roasting, and this modification of the process is within the scope of this invention. It will also be apparent that the apparatus disclosed in the drawing and described in the specification are only illustrative of the invention and that other apparatus may be employed within the scope of the invention. It is contemplated that the coffee may be humidified at any time subsequent to grinding and need not necessarily be humidified immediately after grinding or in bulk in the manner disclosed. If desired, ground coffee in individual containers may be subjected to humidification, although for obvious reasons this process is not preferred. These and other modifications in and improvements to the disclosed process may be practised without departing in any way from the spirit or scope of the invention, for the limits of which reference must be had to the appended claims.

What is claimed is:

1. A method of treating coffee which consists in impregnating roasted and ground coffee with water in sufficient quantity to cause the ligneous material of the coffee particles to swell to thereby inhibit the escape of moisture and oils therefrom but in insufficient quantity to effect any brewing or extraction of the coffee.

2. A method of treating coffee which consists in roasting the coffee beans, grinding the coffee beans, and mixing the ground coffee with hot water in an atomized state in sufficient quantity to cause the ligneous material of the coffee particles to swell and thereby retard the escape of moisture and oils therefrom but in insufficient quantity to effect any brewing or extraction of the coffee.

CHARLES E. PAGE.